United States Patent

Kobayashi

[19]

[11] Patent Number: 5,984,472
[45] Date of Patent: Nov. 16, 1999

[54] PAIR OF EYEGLASSES AND FRAMES THEREOF

[75] Inventor: Mitsuo Kobayashi, Fukui-ken, Japan

[73] Assignee: Yugen Kaisha Mana Japan, Kukui-ken, Japan

[21] Appl. No.: 09/141,426

[22] Filed: Aug. 27, 1998

[30] Foreign Application Priority Data

Sep. 11, 1997 [JP] Japan .................................. 9-246596

[51] Int. Cl.[6] ..................................... G02C 5/22
[52] U.S. Cl. .............................................. 351/153; 16/228
[58] Field of Search ...................... 351/111, 119, 351/121, 153, 110, 113, 116; 16/228

[56] References Cited

U.S. PATENT DOCUMENTS 5,818,568 10/1998 Onaga et al. .......................... 351/153

FOREIGN PATENT DOCUMENTS 8-227057 9/1996 Japan .

*Primary Examiner*—Huy Mai
*Attorney, Agent, or Firm*—Nikaido Marmelstein Murray & Oram, LLP.

[57] ABSTRACT

A pair of eyeglass frames is provided which includes a pair of eyewires, each adapted to encircle a lens, two engagement pins formed at end of each of eyewire, two hinge structures, each holding fixedly the engagement pins of corresponding eyewires, two temples, each rotatably fixed to a hinge structure, each hinge structure articulating each of the corresponding temples and eyewires and comprising upper and lower sections to hold one of the temple and the corresponding eyewires rotatably relative to the other of the temple and the corresponding eyewire between the upper and lower sections. A pair of rimless eyeglass frames adapted to receive a pair of lenses is also provided which includes a pair of temples each adapted to be rotatably fixed to a lens by means of a fastening-and-articulating assembly including a fastening part and an articulating part, the fastening part of the assembly adapted to be detachably inserted in a hole made at a selected location of the lens and comprising an inserting section having a shape commensurate with the hole, the commensurate shapes of the inserting section and the hole preventing the inserting section from rotating in the hole, and a jointing section having coupling means to couple with the articulating part, the jointing section being affixed to the inserting section, and adapted to be in contact with the circumference of the lens, and the articulating part comprising a hinge structure having separate upper and lower sections to rotatably hold the temple with the coupling means of the jointing section. An eyeglass temple is also provided having the features of one of the temples employed in the rimless eyeglass frames.

19 Claims, 5 Drawing Sheets

PAIR OF EYEGLASSES AND FRAMES THEREOF

BACKGROUND OF THE INVENTION

1. Field of the Invention

The present invention relates to an improvement in or relating to a joint piece structure for selected parts of eyeglasses, and more particularly such a joint piece structure for articulating each eyewire and an associated temple, which structure permits the articulating of these parts simply by press-fitting, using no screws.

2. Description of Related Art

One example of such a joint piece structure is shown in Japanese Patent 8-227057(A). Referring to FIG. 10a to FIG. 10c, a pair of eyeglasses comprises a pair of eyewires R each encircling a lens L. Two engagement pins 10, 10 are formed at the open end of each eyewire R.

Each temple T has a hook-like end 30 and a retainer pin 40 integrally connected thereto. A joint piece 20 is a pinched-in cylinder having a through hole 20a made in its upper and lower parts, and it functions like a hinge by inserting the parallel engagement pins 10 and 10 of the eyewire R in the upper and lower through holes 20a and by press-fitting the hook-like end 30 of the temple T around the narrow part 20b of the pinched-in cylinder 20. Thus, the temple T can be rotatably fixed to the eyewire R by the joint piece 20, and its rotation relative to the lens L is permitted until the detent pin 40 abuts against the terminal lengths of the parallel engagement pins 10 and 10 projecting from the joint piece 20.

Advantageously the joint piece structure permits the articulating of the temple and the eyewire without using screws. The press-fitting of the hook-like end 30 of the temple T around the narrow part 20b of the pinched-in cylinder 20, however, requires a significant time-consuming work. Also, disadvantageously temples are less compatible with another.

Still disadvantageously, the round hook-like end 30 of the temple T is liable to lose functional resistance to be experienced when rotating the temple around the pinched-in cylinder 20.

SUMMARY OF THE INVENTION

In view of the above, one object of the present invention is to provide an improved joint piece structure permitting the articulating of selected parts of eyeglasses such as a temple and an associated eyewire simply by press-fitting, without losing the effective resistance experienced at the temple when rotating around the joint piece.

In a pair of eyeglasses comprising a pair of eyewires each encircling a lens, two engagement pins formed at the open end of each eyewire, two joint of hinge pieces for holding fixedly the engagement pins of the eyewires and two temples rotatably fixed to the joint pieces there is provided a joint piece structure for selected parts of eyeglasses according to the present invention comprising upper and lower sections to hold the temple rotatably therebetween.

With this arrangement each temple can be rotatably connected to the eyewire easily without using screws.

The upper or lower section may have a projection of reduced diameter, whereas the other section may have an axial hole for accommodating the projection of the counter section, thereby permitting the detachable connection of the upper and lower sections in concentric alignment. Each temple may have a through hole made on one end, thereby permitting the projection of reduced diameter to pass through the through hole for articulating the temple to the eyewire.

This arrangement facilitates the articulating of the temple to the eyewire.

Each eyewire or joint piece may have a detent detachably attached thereto for preventing rotation of the temple beyond a certain limit. Removal of the detachable detent from the eyewire or joint piece allows the pair of eyeglasses to be changed a reversible one.

Each joint piece may have two through holes made therein, the two engagement pins being fixed to the joint piece by passing through the two through holes of the joint piece and by bending one of the ends of the two engagement pins on the side of the joint piece, permitting the bent end to function as detent for preventing rotation of the temple beyond a certain limit.

This structure has the effect of preventing the eyewire from slipping-off the temple, and at the same time, preventing the temple from rotating beyond a certain angular limit.

In a pair of rimless eyeglasses having a pair of temples each rotatably fixed to the lens by means of a fastening-and-articulating assembly, the fastening part of which assembly is detachably inserted in a hole made at a selected location of the lens such a fastening-and-articulating assembly structure is improved according to the present invention in that: the fastening part comprises an inserting section such as a bolt having the same shape as the hole, the shape preventing the inserting section from rotating in the hole, and a jointing section having coupling means to couple with the articulating part, the jointing section being supported by the inserting section, and being put in contact with the circumference of the lens; and the articulating part comprises upper and lower sections to rotatably hold the temple with the coupling means of the jointing section.

The jointing section may have a ring integrally connected thereto and functioning as coupling means, and the upper or lower section may have a projection of reduced diameter, whereas the other section may have an axial hole for accommodating the projection of the counter section, thereby permitting the detachable connection of the upper and lower sections in concentric alignment by inserting the projection of the counter or male section in the axial hole of the female section.

Each temple may have two parallel engagement pins formed at its pivotal end, and each of the upper and lower sections may have one through hole made therein, thus permitting the two engagement pins of the bifurcate end of the temple to be fixed to the joint piece by passing through the two through holes of the joint piece and by bending one of the ends of the two engagement pins to be laid on the side of the joint piece, thus permitting the bent end to function as detent for preventing rotation of the temple beyond a certain limit.

This structure has the effect of preventing the slipping-off of the temple from the fastening-and-articulating assembly, and at the same time, preventing the temple from rotating beyond a certain angular limit.

The jointing section may have a detent to prevent the temple from rotating beyond a certain angular limit.

Other objects and advantages of the present invention will be understood from the following description of some preferred embodiments of the present invention, which are shown in accompanying drawings.

DESCRIPTION OF THE PREFERRED EMBODIMENTS

Figure 1:
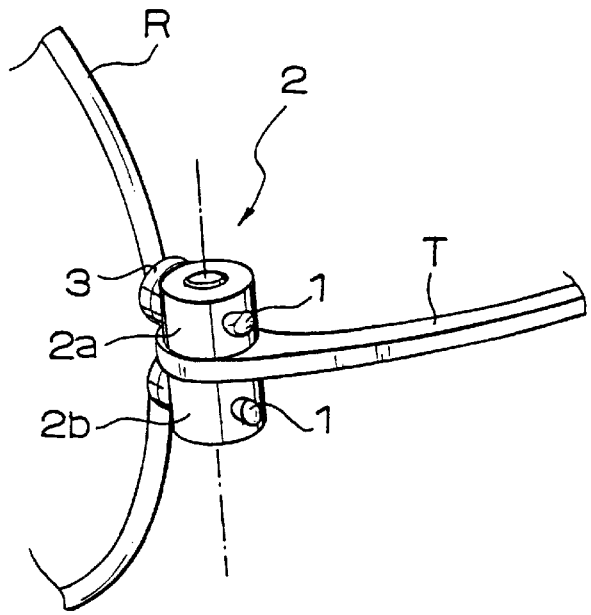
FIG. 1 is a perspective view of an eyewire-to-temple joint structure according to a first embodiment.
Figure 2:
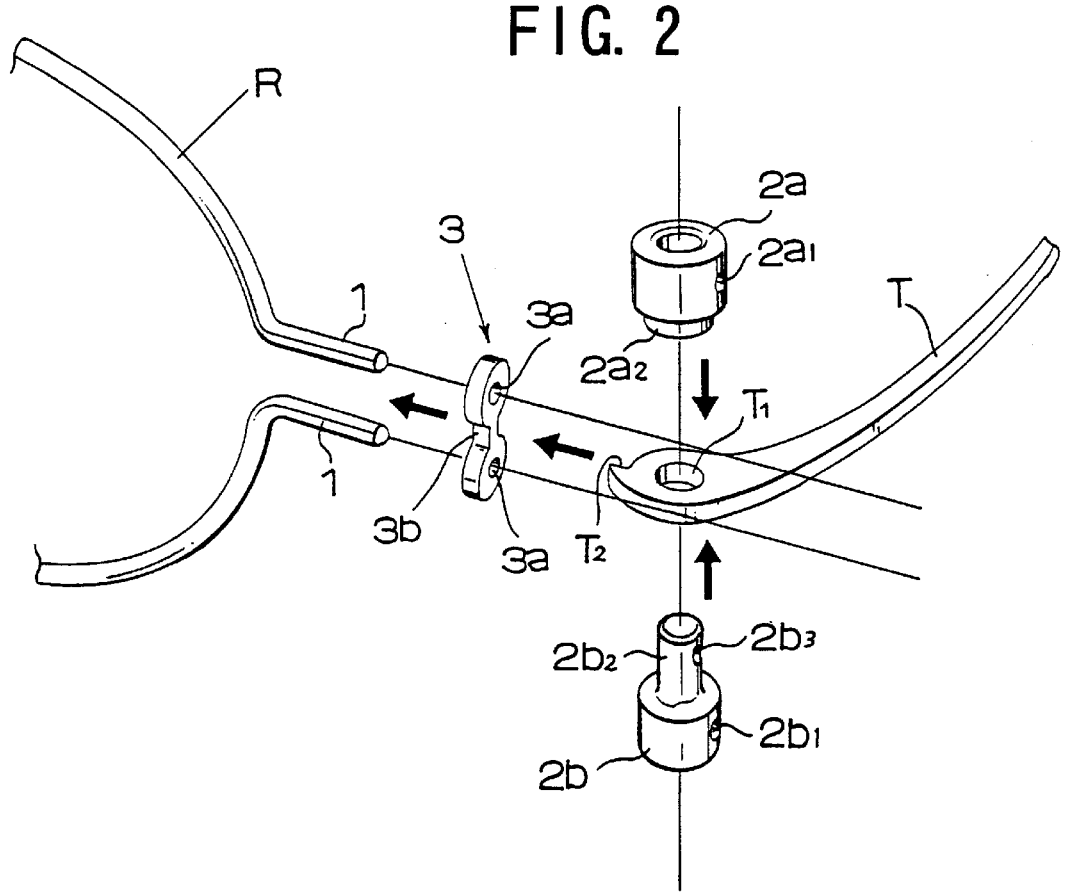
FIG. 2 is an exploded view of the eyewire-to-temple joint structure.

Referring to FIGS. 1 and 2, a pair of eyeglasses comprises a pair of eyewires R and two temples T hinged to the eyewires R. Specifically each eyewire R encircles a lens, and it has two parallel engagement pins 1, 1 formed at open ends thereof, as best seen in FIG. 2. A joint piece of hinge structure 2 holds fixedly the parallel engagement pins 1 and 1 of the eyewire R, and the temple T is rotatably fixed to the joint piece 2. As shown, the joint piece 2 comprises upper and lower sections 2a and 2b to hold the temple T rotatably therebetween.

The eyewire R is made of nickel or titanium alloys, and is press-fitted in the circumferential groove of the lens, thereby detachably holding the lens.

The eyewire R has two parallel engagement pins 1 and 1 formed at open ends thereof. These parallel engagement pins 1 and 1 are inserted in the through holes $2a_1$ and $2b_1$ of the upper and lower sections 2a and 2b of the joint piece 2, as later described.

As seen from FIG. 2, the upper and lower sections 2a and 2b are so formed that these separate sections may be concentrically connected and disconnected from each other. Each separate section has a through hole $2a_1$ or $2b_1$ made therein.

The upper section 2a is a hollow cylinder having a round projection of reduced diameter $2a_2$ formed on its bottom, thereby permitting the upper section 2a to be inserted in the hole $T_1$ of the pivotal end of the temple T. The lower section 2b is a solid disk having an elongated round projection $2b_2$ formed on one side. The solid disk has a through hole $2b_1$ made therein. The elongated round projection $2b_2$ has the same diameter as the axial hole of the hollow cylinder 2a, thus permitting the elongated round projection $2b_2$ to be inserted in the hollow cylinder 2a. The elongated round projection $2b_2$ has a through hole $2b_3$ so made as to be in registration with the through hole $2a_1$ of the upper section 2a when the elongated round projection $2b_2$ is inserted in the hollow cylinder 2a.

A detent 3 is a cocoon-like piece having two apertures 3a and 3a made therein, and the temple T can be prevented from rotating when the notched, nose-like part $T_2$ of the pivotal end of the temple T abuts against the pinched-in part 3b of the detent 3.

The temple T can be rotatably fixed to the eyewire R simply by: inserting the reduced diameter $2a_2$ of the upper section 2a in the hole $T_1$ of the pivotal end of the temple T; inserting the elongated round projection $2b_2$ of the lower section 2b in the axial hole of the upper section 2a; and inserting the parallel engagement pins 1 and 1 of the eyewire R in the apertures 3a of the detent 3, the through hole $2a_1$ of the upper section 2a, the through hole $2b_3$ of the elongated round projection $2b_2$ of the lower section 2b, and at the same time, the through hole $2b_1$ of the lower section 2b of the joint piece 2.

When it is desired that the lens L be removed from the eyewire R, it suffices that the engagement pins 1 and 1 are pulled apart from the joint piece 2.

The rotatable insertion of the reduced diameter $2a_2$ of the upper section 2a in the hole $T_1$ of the pivotal end of the temple T gives a pleasing resistance to the temple T in folding and raising the temple T from the eyewire R.

Figure 3:
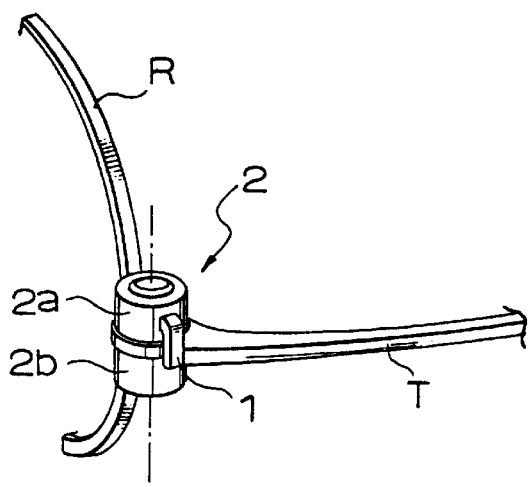
FIG. 3 is a perspective view of an eyewire-to-temple joint structure according to a second embodiment.
Figure 4:
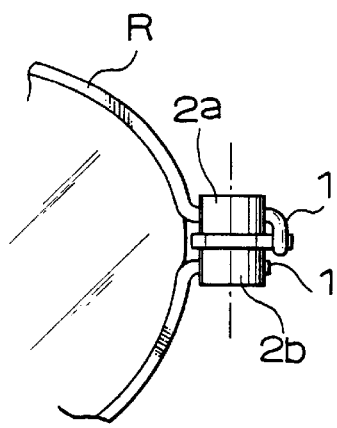
FIG. 4 is a front view of the eyewire-to-temple joint structure.

FIGS. 3 to 5 show a joint piece 2 according to the second embodiment of the present invention, indicating the same parts as used in the first embodiment by same reference numerals as used in FIGS. 1 and 2, and new parts, which are not used in the first embodiment, by new reference numerals.

FIG. 3 is a perspective view of the joint piece 2 having the upper engagement pin 1 of the eyewire R bent downward in place of the detent 3.

The eyewire R is made of nickel or titanium alloy, and its parallel engagement pins 1 and 1 are inserted in the side hole $2a_1$ of the upper section 2a, the hole $2b_3$ of the elongated projection $2b_2$ and the side hole $2b_1$ of the lower section 2b. A short terminal length of upper engagement pin 1 appears after passing through the side hole $2a_1$ of the upper section 2a whereas little or no terminal length of lower engagement pin 1 appears after passing through the side hole $2b_1$ of the lower section 2b (see FIG. 4). The short terminal length of upper engagement pin 1 is bent down to be laid on the side of the joint piece 2.

Figure 5A:
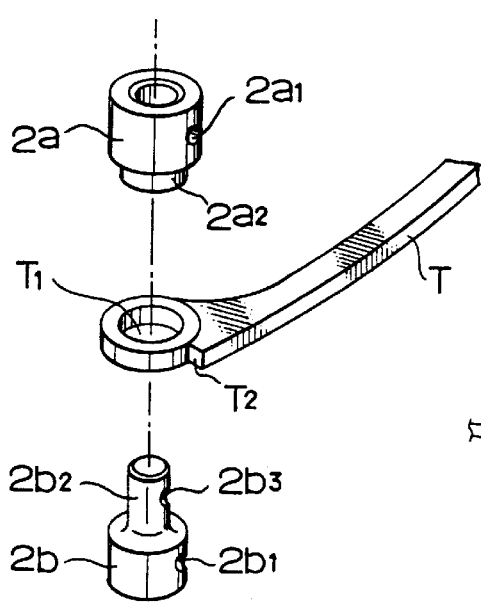
FIG. 5(a) is an exploded view of the eyewire-to-temple joint structure.
Figure 5B:
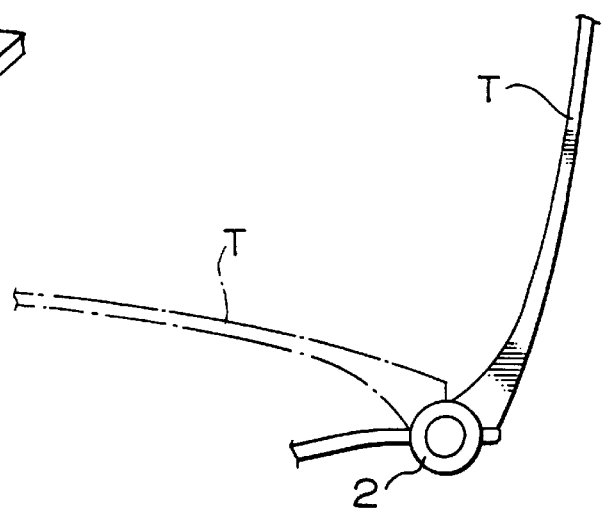
FIG. 5(b) shows how the temple can be rotated within a predetermined angular range.

As best seen from FIG. 5(a), the temple T has a through hole $T_1$ made in the pivotal end of the temple T, and a radial extension $T_2$ formed on the circumference of the pivotal end of the temple T. As seen from FIG. 5(b), the temple T is allowed to rotate within a certain angular range. It cannot be rotated beyond a certain angular limit as the radial extension $T_2$ of the pivotal end of the temple T is caught by the short terminal length of upper engagement pin 1 bent on the side of the joint piece 2. Thus, no separate detent is required.

FIGS. 6 to 9 show a fastening-and-articulating assembly structure according to the third embodiment of the present invention, indicating new parts, which are not used in the first and second embodiments, by new reference numerals.

Figure 6:
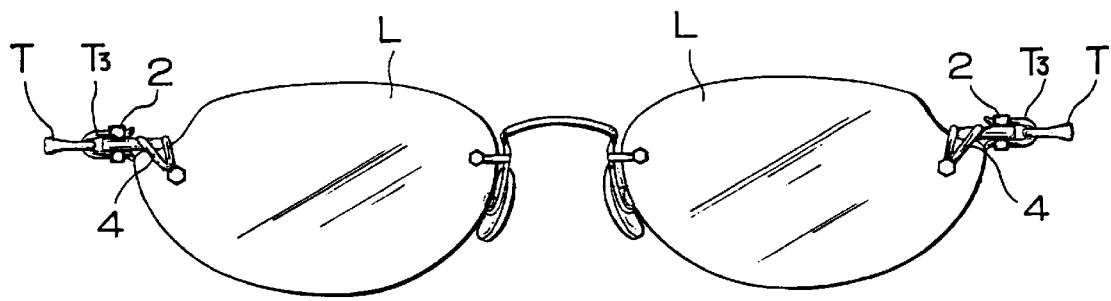
FIG. 6 is a pair of rimless eyeglasses using joint structures according to a third embodiment.
Figure 7:
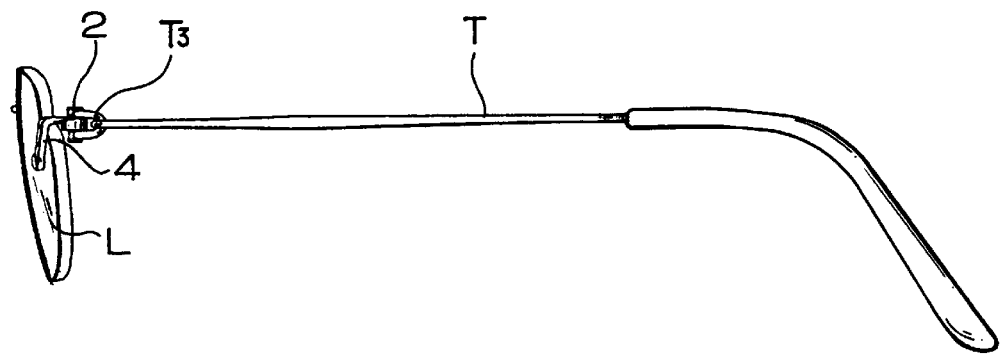
FIG. 7 is a side view of the rimless eyeglasses.
Figure 8:
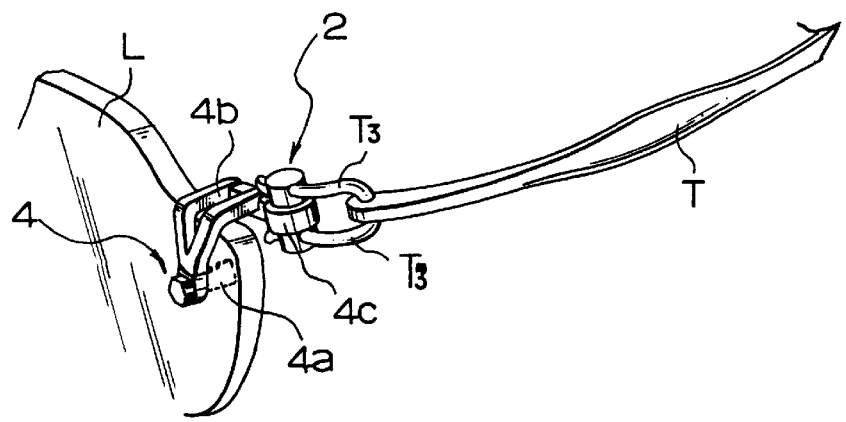
FIG. 8 is a perspective view of the lens-to-temple joint structure.
Figure 9:
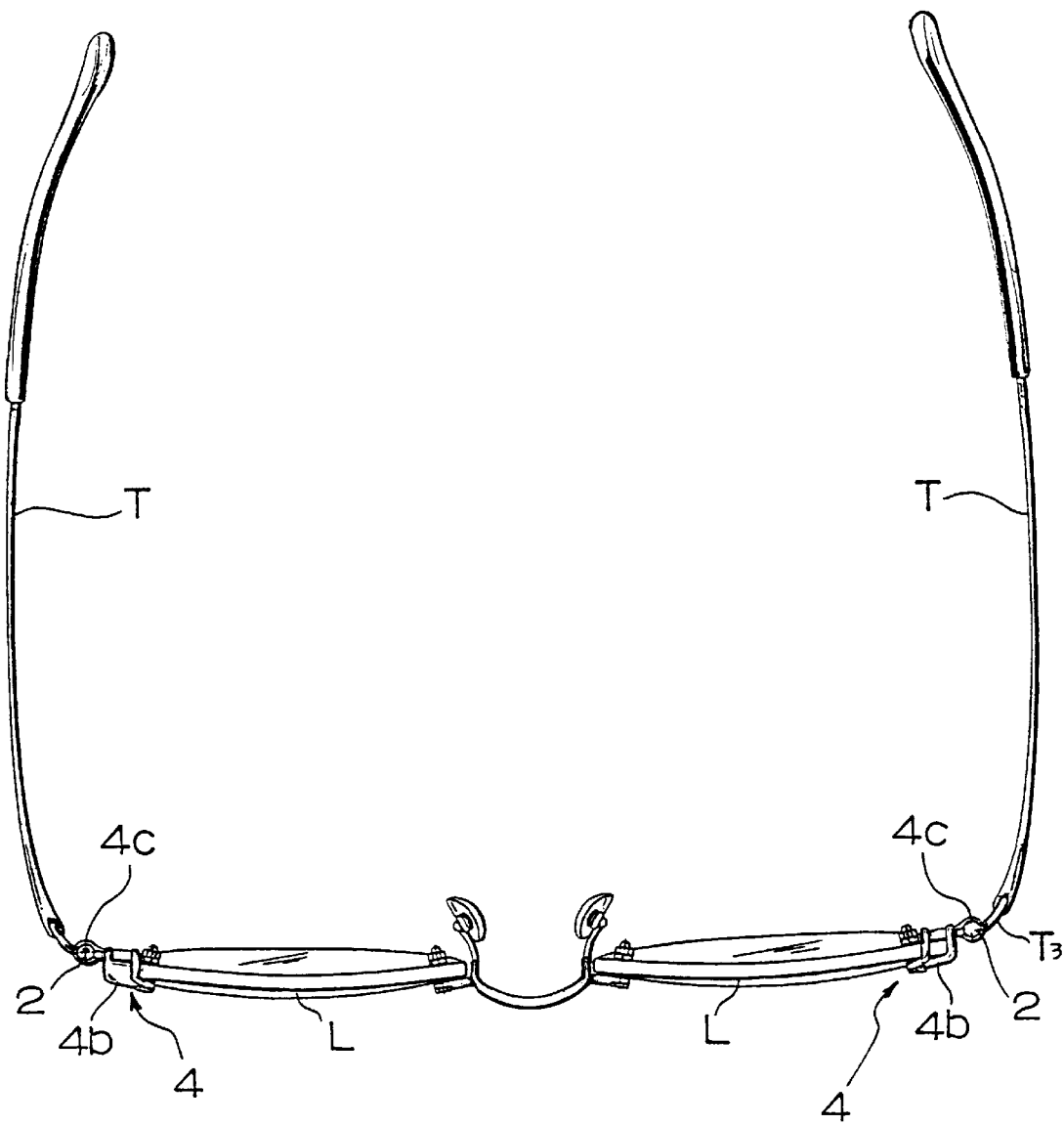
FIG. 9 is a plane view of the rimless eyeglasses.
Figure 10A:
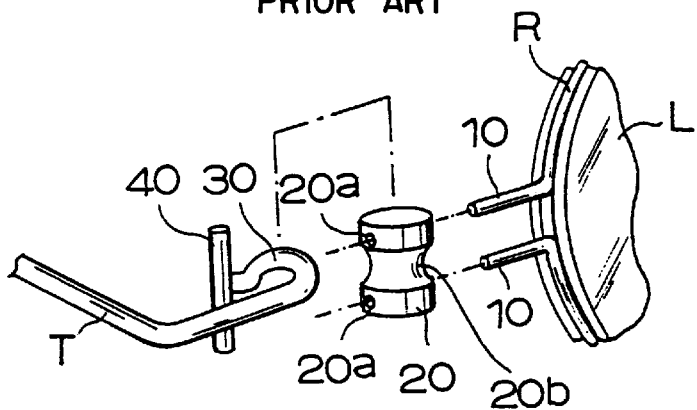
FIGS. 10(a), (b) and (c) show a conventional eyewire-to-temple joint structure.
Figure 10B:
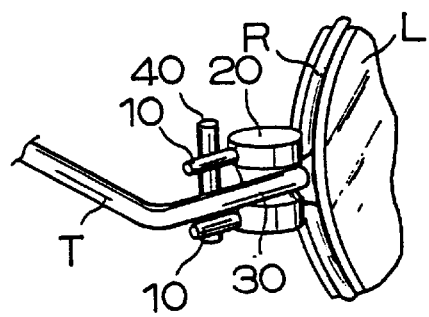
Figure 10C:
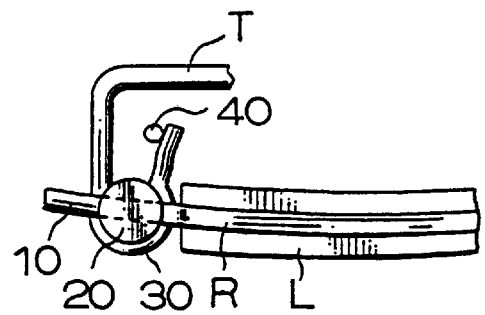

FIG. 6 is a front view of a pair of rimless eyeglasses having two temples T hinged to its lenses L via associated fastening-and-articulating assemblies. Specifically each fastening-and-articulating assembly includes a fastening part 4 for fixing the temple T to a predetermined location of each lens L. The fastening part 4 comprises an inserting section 4a and a jointing section 4b. The inserting section 4a is a bolt to be inserted in a hole, which is made at the predetermined location of each lens L. The bolt has the same shape as the hole, and the shape of the bolt, and hence the hole is so selected that it may prevent the bolt from rotating in the hole. Such inserting section 4a supports the jointing section 4b, which is put in contact with the circumference of the lens L, as best seen from FIG. 8.

The jointing section 4b has a ring 4c for rotatably holding the joint piece 2, thereby permitting the hinging of the temple T to the lens L. As best seen from FIG. 8, the temple T has two parallel engagement pins $T_3$ and $T_3$ formed at its pivotal end. The ring $4c$ has a joint piece 2 rotatably fixed thereto by inserting the reduced diameter $2a_2$ of the upper section $2a$ in the ring $4c$ and by inserting the elongated round projection $2b_2$ of the lower section $2b$ in the axial hole of the upper section $2a$. Then, the bifurcate end of the temple T is fixed to the joint piece 2 by inserting its parallel engagement pins $T_3$ and $T_3$ in the through hole $2a_1$ of the upper section $2a$, the through hole $2b_3$ of the elongated round projection $2b_2$ of the lower section $2b$, and the through hole $2b_1$ of the lower section $2b$ of the joint piece 2, and by bending one of the ends of the engagement pins $T_3$ and $T_3$ to be laid on the side of the joint piece, thus permitting the bent end to function as detent for preventing rotation of the temple beyond a certain limit, and at the same time, preventing the slipping-off of the temple from the fastening-and-articulating assembly. The detent (not shown) may be used as a separate part, as is the case with the first embodiment.

The joint piece structure is described above as being applied to the rotatable connection of the temple to the eyewire, but it can be equally applied to the lens-to-bridge connection. Also, the joint piece structure is described as being used with a metal eyewire, but it can be equally used with a synthetic resin eyewire or an ordinary solid front.

What is claimed is:

1. A pair of eyeglass frames comprising:
   a pair of eyewires, each adapted to encircle a lens;
   two engagement pins formed at the open end of each of eyewire;
   two hinge structures, each holding fixedly the engagement pins of corresponding eyewires;
   two temples, each rotatably fixed to a hinge structure, each hinge structure articulating one of the temples and corresponding eyewires and comprising separate upper and lower sections to hold one of the temples therebetween and the corresponding eyewires rotatably relative to one of the temples.

2. A pair of eyeglass frames according to claim 1 wherein one of the upper and lower sections has a projection of reduced diameter, whereas the other of the upper and lower sections has an axial hole for accommodating the projection of the one of the upper and lower sections, thereby permitting the detachable connection of the upper and lower sections in concentric alignment.

3. A pair of eyeglass frames according to claim 2 wherein each temple has a through hole in one end thereof, thereby permitting the projection of reduced diameter to pass through the through hole for articulating the temple to the eye wire.

4. A pair of eyeglass frames according to claim 1 or 2 wherein each eyewire or hinge structure has a detent detachably attached thereto for preventing rotation of the temple beyond a certain limit.

5. A pair of eyeglass frames according to claim 1 wherein each hinge structure has two through holes made therein, the two engagement pins having terminal ends of uneven lengths being fixed to the hinge structure by passing through the two through holes of the hinge structure, the longer of the terminal lengths of the two engagement pins appearing on the side of the hinge structure and being bent to function as a detent for preventing rotation of the temple beyond a certain limit.

6. A pair of eyeglass frames according to claim 1 wherein one of the upper and lower sections comprises a hollow cylinder having an axially disposed hole and a round projection of reduced outer diameter at one end thereof for insertion through an aperture formed in the pivotal end of a temple, and the other of the upper and lower sections comprises a solid disk having an elongated projection commensurate in shape to the axially disposed hole, formed on one side of the disk, and a first radially disposed through hole in the solid disk and a second radially disposed through hole in the elongated projection, said second through hole formed to be in registration with a radially disposed through hole formed in the one of the upper and lower sections.

7. A pair of eyeglasses frames according to claim 1 wherein said upper and lower sections are detachably connected.

8. A pair of rimless eyeglasses comprising a pair of temples each rotatably fixed to a lens by means of a fastening-and-articulating assembly including a fastening part and an articulating part, the fastening part of the assembly being detachably inserted in a hole made at a selected location of the lens and comprising an inserting section having a shape commensurate with the hole, the commensurate shapes of the inserting section and the hole preventing the inserting section from rotating in the hole, and a jointing section having coupling means to couple with the articulating part, the jointing section being affixed to the inserting section, and arranged in contact with the circumference of the lens; and the articulating part comprising a hinge structure having separate upper and lower sections to rotatably hold the temple with the coupling means of the jointing section.

9. A pair of rimless eyeglasses according to claim 8 wherein the jointing section has a ring integrally connected thereto and functioning as coupling means, and one of the upper or lower sections of the hinge structure has a projection of reduced diameter, whereas the other of the upper and lower sections has an axial hole for accommodating the projection of said one of the upper and lower sections, thereby permitting the detachable connection of the upper and lower sections in concentric alignment by inserting the projection of the one of the upper and lower sections in the axial hole of the other of the upper and lower sections.

10. A pair of rimless eyeglasses according to claim 9 wherein each temple has two parallel engagement pins having terminal ends of uneven lengths defining a bifurcate end formed at the pivotal end of the temple; and each of the upper and lower sections has one through hole made therein, thus permitting the two engagement pins of the bifurcate end of the temple to be fixed to the hinge structure by passing through the two through holes of the hinge structure, the longer terminal end of the two engagement pins appearing on the side of the hinge structure, being bent to function as a detent for preventing rotation of the temple beyond a certain limit.

11. A pair of rimless eyeglasses according to claim 9 wherein each temple has two parallel engagement pins defining a bifurcate end formed at the pivotal end of the temple, and each of the upper and lower sections has one through hole made therein, thus permitting the two engagement pins of the bifurcate end of the temple to be fixed to the hinge structure piece by passing through the two through holes of the hinge structure, the terminal ends of the two engagement pins being bent on the side of the hinge structure, and the engagement pins forming a detent to prevent the temple from rotating beyond a certain angular limit.

12. A pair of rimless eyeglasses according to claim 8 wherein said upper and lower sections are detachably connected.

13. A pair of rimless eyeglasses according to claim 8 wherein said inserting section comprises a bolt.

14. An eyeglass temple adapted for use in a pair of rimless eyeglass frames which receive a pair of lenses comprising temples adapted to be rotatably fixed to a lens by means of a fastening-and-articulating assembly including a fastening part and an articulating part, the fastening part of the assembly adapted to be detachably inserted in a hole made at a selected location of the lens and comprising an inserting section having a shape commensurate with the hole, the commensurate shapes of the inserting section and the hole preventing the inserting section from rotating in the hole, and a jointing section having coupling means to couple with the articulating part, the jointing section being affixed to the inserting section, and adapted to be in contact with the circumference of the lens; and the articulating part comprising a hinge structure having separate upper and lower sections to rotatably hold the temple with the coupling means of the jointing section.

15. An eyeglass temple according to claim 14 wherein the jointing section has a ring integrally connected thereto and functioning as coupling means, and one of the upper or lower sections of the hinge structure has a projection of reduced diameter, whereas the other of the upper and lower sections has an axial hole for accommodating the projection of the one of the upper and lower sections, thereby permitting the detachable connection of the upper and lower sections in concentric alignment by inserting the projection of the one of the upper and lower sections in the axial hole of the other of the upper and lower sections.

16. An eyeglass temple according to claim 15 wherein each temple has two parallel engagement pins defining a bifurcate end formed at the pivotal end of the temple, and each of the upper and lower sections has one through hole made therein, thus permitting the two engagement pins of the bifurcate end of the temple to be fixed to the hinge structure by passing through the two through holes of the hinge structure the terminal ends of the two engagement pins being bent on the side of the hinge structure, and the jointing section having a detent to prevent the temple from rotating beyond a certain angular limit.

17. An eyeglass temple according to claim 14 wherein each temple has two parallel engagement pins having terminal ends of uneven lengths defining a bifurcate end formed at the pivotal end of the temple; and each of the upper and lower sections has one through hole made therein, thus permitting the two engagement pins of the bifurcate end of the temple to be fixed to the hinge structure by passing through the two through holes of the hinge structure, the longer terminal end of the two engagement pins appearing on the side of the hinge structure, being bent to function as a detent for preventing rotation of the temple beyond a certain limit.

18. An eyeglass temple according to claim 14 wherein said upper and lower sections are detachably connected.

19. An eyeglass temple according to claim 14 wherein said inserting section comprises a bolt.

* * * * *